US012252292B2

(12) United States Patent
Moore et al.

(10) Patent No.: US 12,252,292 B2
(45) Date of Patent: Mar. 18, 2025

(54) SYSTEMS AND METHODS FOR APPLYING LABELS TO FOOD PRODUCTS

(71) Applicant: Sinclair Systems International, LLC, Fresno, CA (US)

(72) Inventors: Tim Moore, Fresno, CA (US); David Southwood, Fresno, CA (US)

(73) Assignee: Sinclair Systems International, LLC, Fresno, CA (US)

(*) Notice: Subject to any disclaimer, the term of this patent is extended or adjusted under 35 U.S.C. 154(b) by 98 days.

(21) Appl. No.: 18/333,589

(22) Filed: Jun. 13, 2023

(65) Prior Publication Data

US 2023/0399138 A1 Dec. 14, 2023

Related U.S. Application Data

(60) Provisional application No. 63/351,873, filed on Jun. 14, 2022.

(51) Int. Cl.
*B65C 9/18* (2006.01)
*B65C 9/00* (2006.01)

(52) U.S. Cl.
CPC .......... *B65C 9/1876* (2013.01); *B65C 9/0006* (2013.01)

(58) Field of Classification Search
CPC .... B65C 2009/0009; B65C 2009/0087; B65C 9/0006; B65C 9/1876; B65C 9/1884
See application file for complete search history.

(56) References Cited

U.S. PATENT DOCUMENTS 4,217,164 A 8/1980 La Mers
4,896,793 A 1/1990 Briggs et al.
7,168,472 B2 * 1/2007 Hirst .................... B65C 9/188 156/387
2005/0021137 A1 9/2005 Hirst et al.
2019/0071205 A1 3/2019 Sleiman
2023/0399138 A1 * 12/2023 Moore ................ B65C 9/0006

FOREIGN PATENT DOCUMENTS

EP 1057731 A1 12/2000

OTHER PUBLICATIONS

Translation of DE112006002484.*
Translation of WO0026093.*
Patent Cooperation Treaty, PCT/US2023/068327, International Search Report and Written Opinion of the International Searching Authority, Sep. 27, 2023.

* cited by examiner

*Primary Examiner* — Sonya M Sengupta
(74) *Attorney, Agent, or Firm* — Jones Day

(57) ABSTRACT

Systems and methods for applying labels to food products include pulling a label on two part backing along a pathway comprising one or more rollers to a stripping point in a first direction, the two part backing comprising a first strip and a second strip. The two part backing is removed from the label by pulling the label from the first strip and the second strip at the stripping point using suction by either a pair of stacked v-shaped first and second plates or by angled nose rollers.

35 Claims, 18 Drawing Sheets

SYSTEMS AND METHODS FOR APPLYING LABELS TO FOOD PRODUCTS

CROSS-REFERENCE TO RELATED APPLICATIONS

This application claims priority to U.S. Provisional Application No. 63/351,873, filed Jun. 14, 2022, the entirety of which is incorporated herein by reference.

TECHNICAL FIELD

The present disclosure relates generally to the field of food processing and more particularly to automated application of labels to food products.

TECHNICAL DESCRIPTION

Food labels, such as produce labels applied to fruits and vegetables, provide important information to a variety of audiences. Those labels indicate sources of food, food types, reference numbers (e.g., PLUs, SKUs), pricing, indication of proper care (e.g., keep refrigerated), and other information depending on application. Manual application of labels to food can be time and labor intensive, such that automated mechanisms are often preferred. Automated food labeling is often a difficult endeavor, as food products such as fruits and vegetables frequently vary in size and shape. In addition to labeling accuracy, space, speed, and energy conservation are often also important considerations, where food packing and labeling facilities may be in space constrained or remote locations.

SUMMARY

Systems and methods are provided for applying labels to food products. An example system includes a label applicator that includes a pathway comprising one or more rollers configured for transiting a label on two part backing from a label reel to a stripping point in a first direction, the two part backing comprising a first strip and a second strip. The stripping point includes a first plate for removing the two part backing from the label and directing the first strip in a second direction and the second strip in a third direction, the second and third directions being different from the first direction; and a second plate that is configured to further direct the first strip and the second strip in a fourth direction that is different than any of the first direction, the second direction, and the third direction.

In another example, a method for applying labels to food products includes transiting a label on two part backing in a first direction along a pathway comprising one or more rollers to a stripping point, the two part backing comprising a first strip and a second strip. The two part backing is removed from the label by pulling the label from the first strip and the second strip at the stripping point using suction. The first strip and the second strip continue to be pulled over a first plate to direct the first strip in a second direction and the second strip in a third direction, the second and third directions being different from the first direction. The first strip and the second strip are further pulled over a second plate that is configured to further direct the first strip and the second strip in a fourth direction that is different than any of the first direction, the second direction, and the third direction.

In another example, a label applicator comprises a pathway comprising one or more rollers configured for transiting a label on two part backing from a reel to a stripping point in a first direction, the two part backing comprising a first strip and a second strip; wherein the stripping point comprises: two angled nose rollers for removing the two part backing from the label and directing the first strip along a first strip pathway in a direction opposite from the first direction and the second strip along a second strip pathway opposite from the first direction.

In another example, a method for applying labels to food products includes transiting a label on two part backing in a first direction along a pathway comprising one or more rollers to a stripping point, the two part backing comprising a first strip and a second strip. The two part backing is removed from the label by pulling the label from the first strip and the second strip at the stripping point using suction. The first strip and the second strip each continue around an angled nose rollers to direct the first strip and the second strip in a direction opposite the first direction.

DETAILED DESCRIPTION

Figure 1:
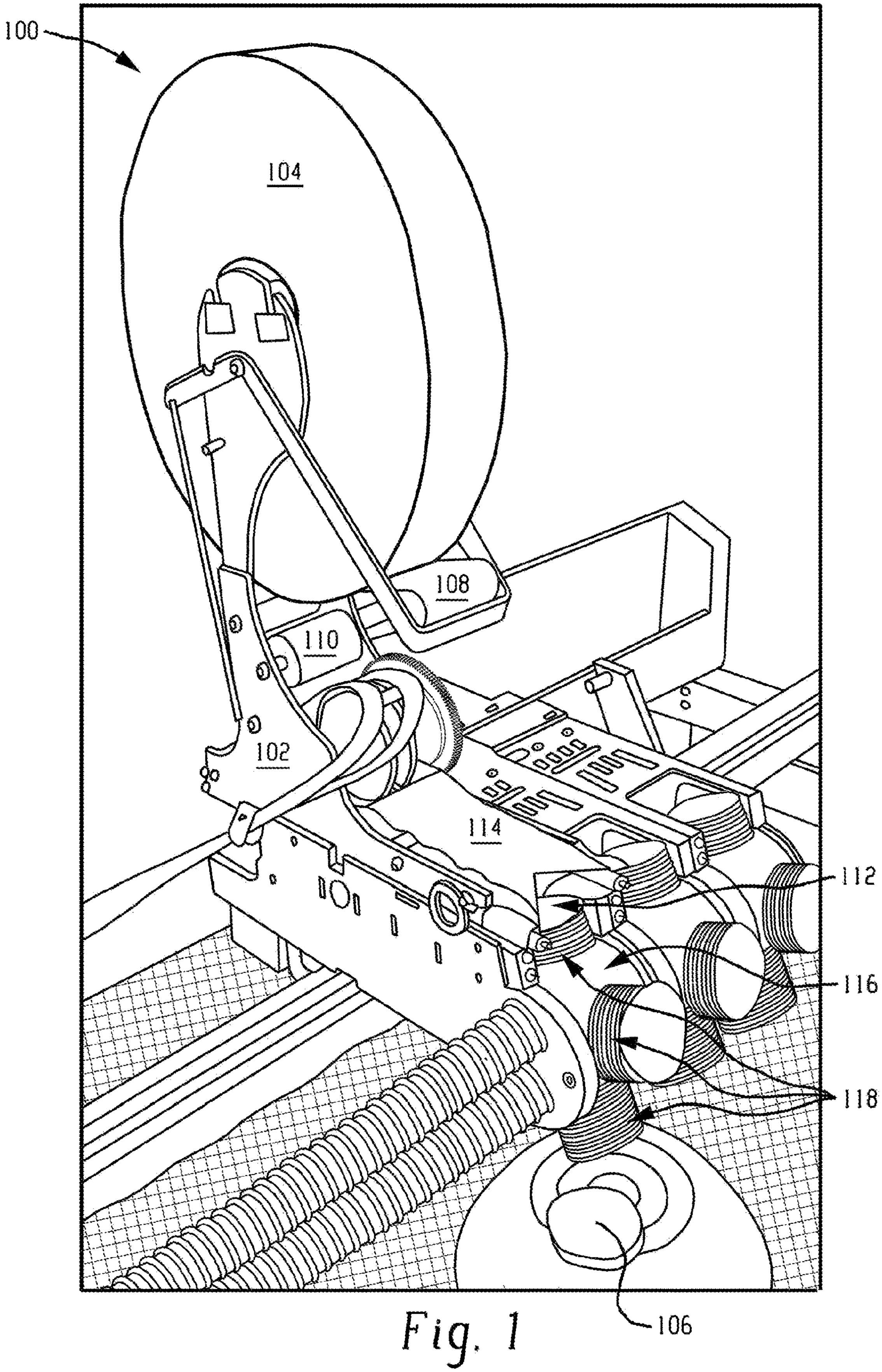
FIG. 1 is depicts a system for applying labels to food products.

FIG. 1 is a diagram depicting a system for applying labels to food products. The system 100 includes a label applicator 102 (sometimes referred to as a "cassette") that is configured to apply labels to food products. The applicator 102 is configured to receive a label reel 104 that holds and dispenses labels off a reel of labels for application to food products. In the example of FIG. 1, the food labels 106 labels are circular in form. Those labels 106 are sticky on one side and include writing on the other side for conveying information regarding the food associated with the labels. In the example of FIG. 1, the backing on the labels prior to application is two part backing, where the two part backing takes the form of two parallel strips of backing material (e.g., siliconized paper), where the two strips are both contacted by and held together by the sticky side of the labels until the label is stripped from the backing and applied to the food product. Once the label is removed from the backing, the two strips are transited by the label applicator to a predetermined location for disposal (e.g., rolled onto one or more reels for disposal of the strips, transited to a disposal bin).

In the example of FIG. 1, labels on the two part backing are pulled from the label reel 104 along a pathway that comprises one or more rollers (e.g., tensioning roller 108, scollop wheel idler roller 110) to a stripping point 112. As described further herein, the stripping point 112 comprises a first plate for removing the two part backing from the label and directing the first strip and the second strip of the two part backing in different directions, A second plate then further directs the first strip and the second strip in yet another direction, where those strips are pulled in parallel (see 114) towards a predetermined area for disposal.

FIG. 1 further depicts a bellows unit 116 that is configured to pull labels from the two part backing at the stripping point 112 using suction. More specifically, the bellows unit 116 includes a plurality of sub-bellows 118. Each sub-bellow is configured to extract single labels from the two part backing using suction at the stripping point 112. A particular sub-bellow 118 removes the label by applying suction to a non-sticky side of a particular label to remove the label from the two part backing at the stripping point 112, where the particular sub-bellow is at a first position (e.g., facing up). The particular sub-bellow is then rotated to a second position (e.g., facing down), where the particular sub-bellow is configured to apply the label to a particular food product, such as when the label applicator detects (e.g., using a vision system, a mechanical detection switch, a pressure sensor, a laser or other light trip) that the particular food product is at the particular sub-bellow in the second position (e.g., underneath the sub-bellow that is facing down). In an embodiment, when the particular food product is detected as being in position, the particular sub-bellow is configured to be extended while releasing the suction holding the label such that the sticky side of the label is brought in contact with the food product, transferring the label from the particular sub-bellow to the particular food item.

In embodiments, the label applicator of FIG. 1 can be implemented adjacent to one or more additional label applicators, such that labels can be applied to parallel streams of food items. FIG. 1 depicts bellow units of two neighboring label applicators (label applicators not shown) to the right of label applicator 102. In embodiments, adjacent label applicators can apply labels to multiple food products simultaneously (e.g., food items on parallel conveyor belts, food items in different columns of a box of food items). The label applicator(s) 102 can be configured to apply labels to different types of food items. For example, the label applicator could be configured to apply labels (e.g., brand owner labels, retailer labels, packing house labels) to kiwis one day and melons the next day.

Figure 2:
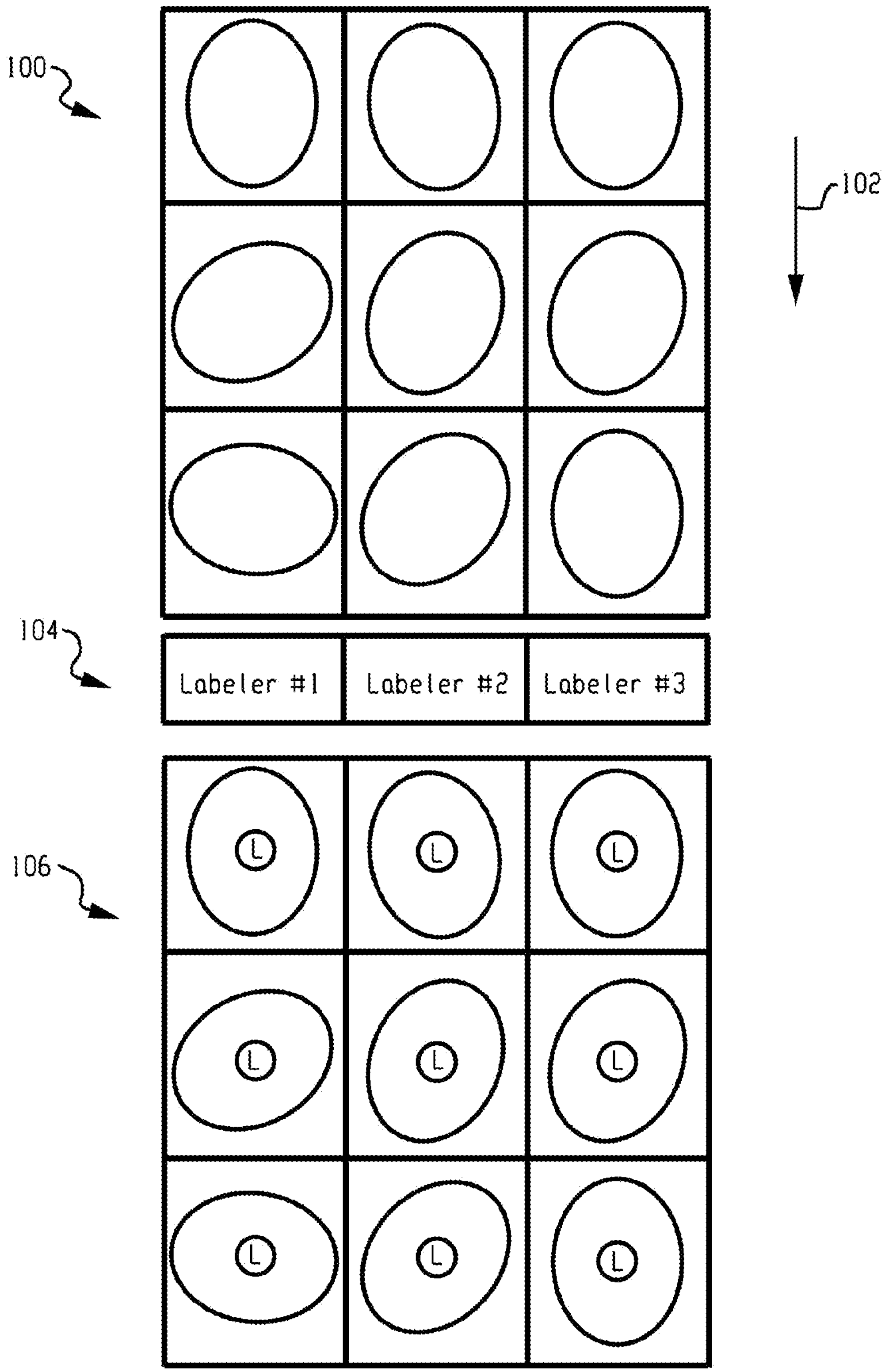
FIG. 2 is a diagram depicting a box of food that can be labeled by a plurality of label applicators operating in parallel.

FIG. 2 is a diagram depicting a box of food 100 that can be labeled by a plurality of label applicators operating in parallel. FIG. 2 depicts a first box 100 containing nine produce items held in a box configured to hold produce in a 3×3 grid, such as by cardboard dividers or holders (e.g., cups) for individual produce items. It is noted that the produce items in each box are of somewhat irregular sizes and shapes. Boxes, including box 100, traverse a line in the direction noted by arrow 102, such as along a conveyor belt. The boxes reach a plurality of label applicators at 104 that are arranged in parallel, such that the plurality of label applicators label the multiple produce items contained within the single box simultaneously as they box moves under the labelers 104. For example, when each applicator senses a food item underneath it, it applies a label (indicated by an "L" in a circle) thereto, as illustrated in box 106 containing labeled produce items. All of the label applicators 104 may be configured to individually sense the presence of produce in position for labeling, or the three depicted label applicators 104 may be configured to simultaneously apply labels based on the detected presence of a row of a box in a position for labeling. In an alternate arrangement, which may depend on the width of label applicators fitting within the width of a column of a box 106, the labelers may be implemented in a staggered fashion. For example, Labeler #1 and Labeler #3 may be aligned so as to simultaneously apply labels to produce in columns 1 and 3 of the box, while Labeler #2 may be positioned before or after those labelers along the line of travel. Such a staggered arrangement may require a longer line of travel that may be disadvantaged in locations where space is at a premium, such that narrower label applicators 104 (e.g., label applicators having widths near the widest label to be handled) are advantageous.

Figure 3:
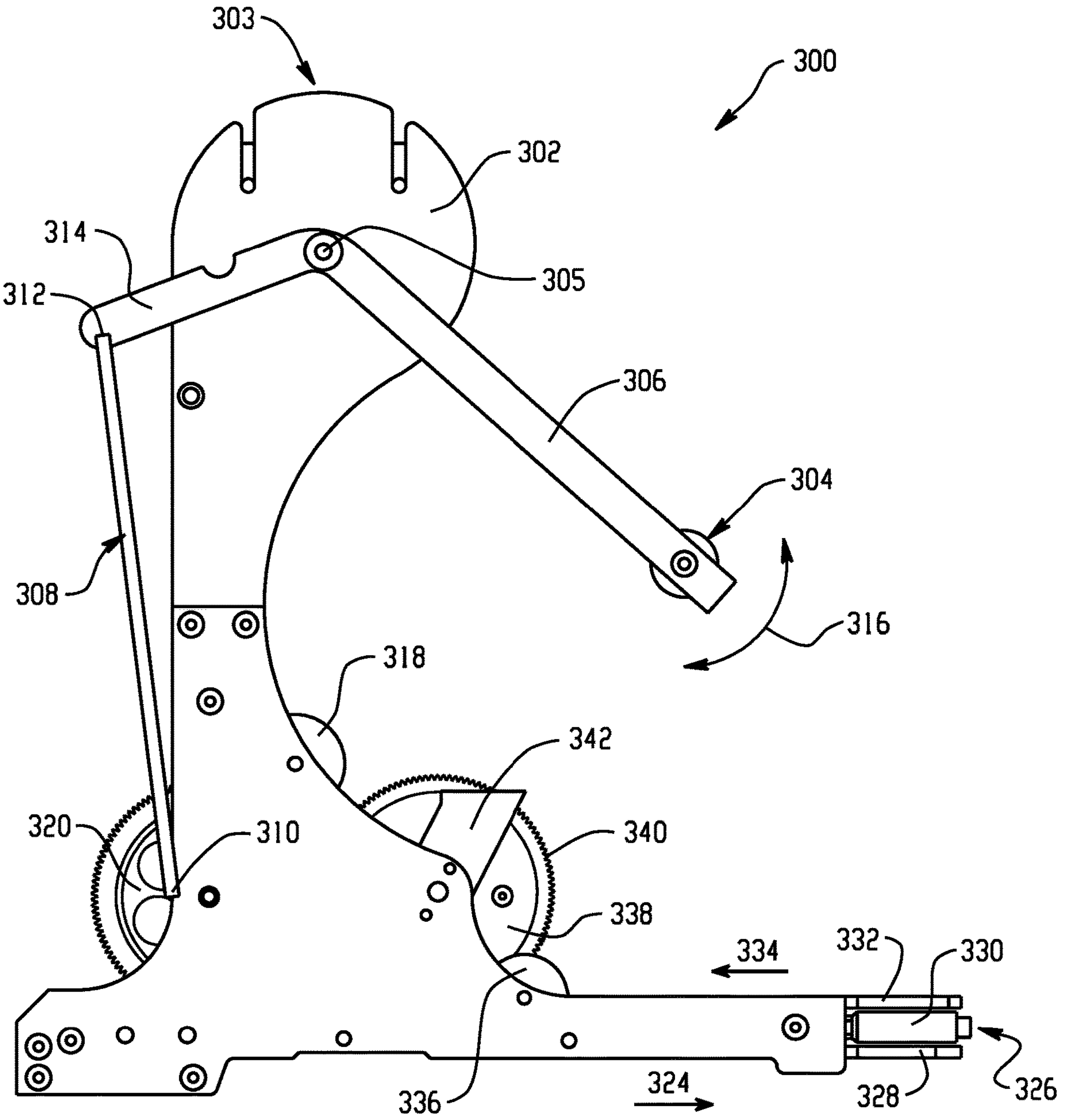
FIG. 3 is a diagram depicting one embodiment of a label applicator comprising one or more transverse stripper rollers positioned between v-shaped portions of first and second plates for transiting a label on a two part backing from a label reel.

FIG. 3 is a diagram depicting one embodiment of a label applicator comprising one or more rollers for transiting a label on two part backing from a label reel. The label applicator 300 includes a side plate 302 of a label reel receptacle 303. The label reel receptacle 303 is configured to receive a reel of labels on two part backing. The two part backing/labels are pulled from the label reel over a tensioning roller 304 suspended at the end of a tension arm 306. The tensioning roller 304 is mounted at a radius from the center of the label reel receptacle 305 that is equal to the length of the tension arm 306, which is greater than the radius of a full reel of labels. The tensioning roller 304 is configured to maintain tension on the two part backing/labels along the pathway from the label reel to the plurality of rollers and wheels that move the two part backing/labels through the label applicator. Tension is applied by tension arm spring 308 that maintains a substantially constant tension of the two part backing along the pathway. The tension arm spring 308 is attached at 310 to a stationary point on the label applicator and to a point 312 on a member 314 that is rigidly connected to the tension arm 306, forcing the tension arm to rotate on an arc 316 based on a balance of forces applied by the tension arm spring 308 and the two part backing/labels running over the tensioning roller 304.

Following traversal of the tensioning roller 304, the two part backing carrying labels runs under a scollop wheel idler roller 318 (e.g., a nip roller), over a scollop wheel 320 (e.g., a roller with scollop shape profile to guide the two part backing/labels or other texture for improving grip on the two part backing and labels). In embodiments, the two part backing paper is cut into a scollop pattern. This scollop pattern may be matched with a corresponding scollop pattern on the scollop wheel, enabling the scollop wheel to apply a pulling force on the backing paper. Further, in production of the reel of labels, the scollop pattern may enable manufacturing to nest labels close together to maximize labels per square meter of paper (e.g., prior to cutting a sheet having rows and columns of labels into strips carrying a single column of labels). The target tension of the tensioning roller 304 via tension arm spring 308 can be implemented so as to maximize the surface of interaction of the two part backing/labels with the scollop wheel idler roller 318 and/or the scollop wheel 320 so as to prevent slippage between those rollers 318, 320 and the two part backing/labels. In an embodiment, the two part backing/labels then travels under a stripper plate idler (not shown in FIG. 3) in a first direction (indicated at 324) before reaching a stripping point 326, where the stripper plate idler can aid in aligning the two part backing and labels with the stripping point 326. The stripping point 326 is where the two part backing carrying the labels interacts with the bellows to remove the labels from the two part backing using suction from the bellows on the non-sticky side such that the bellows can then apply the sticky side of the label to a food product.

In an embodiment as described further herein, the stripping point 326 may include a first plate 328, a pair of transverse stripper rollers 330 oriented parallel to the first direction 324, and a second plate 332 for directing the first strip and the second strip of the two part backing. Following traversal of the stripping point 326, the first strip and the second strip are directed in another direction 334 (e.g., fourth direction as described further herein) that is opposite the first direction 324 toward a sprocket wheel 338. In an embodiment, the first strip and the second strip are transported in this direction 334 for disposal. Specifically, the first strip and the second strip travel over a tape control roller 336 and under a sprocket wheel 338. The sprocket wheel 338 may be driven by a motor that interacts with a sprocket drive wheel gear 340 of the sprocket wheel 338, where that motor and sprocket wheel drive gear 340 are configured to pull the two part tape through the label applicator (e.g., continuously if the presence of food product for labeling can be consistently and reliably reproduced, in an intermittent manner including periodic pauses while waiting for food product to reach its labeling position). In embodiments, as depicted in FIG. 3, the sprocket wheel 338 includes protrusions (e.g., teeth) for piercing each of the first and second strips to provide a pulling force on the strips after the label is removed, and further on the two part backing carrying the labels prior to the labels reaching the stripping point 326. The label applicator may further include a waste tape stripper 342 for deflecting the first and second strips toward away from other portions of the label applicator toward a disposal point (e.g., one or more disposal rolls, a disposal bin) to avoid tangling with other mechanisms of the label applicator. In an embodiment, upon loading of a new label reel, the two part backing with labels is routed (e.g., manually) through the path 304, 318, 320, 324 to the stripping point 326, with the first strip and the second strip then being further routed in direction 334 over tape control roller 336 to the sprocket wheel 338, where the first and second strips are pierced such that they can then be automatically pulled evenly by the sprocket wheel 338.

Figure 4:
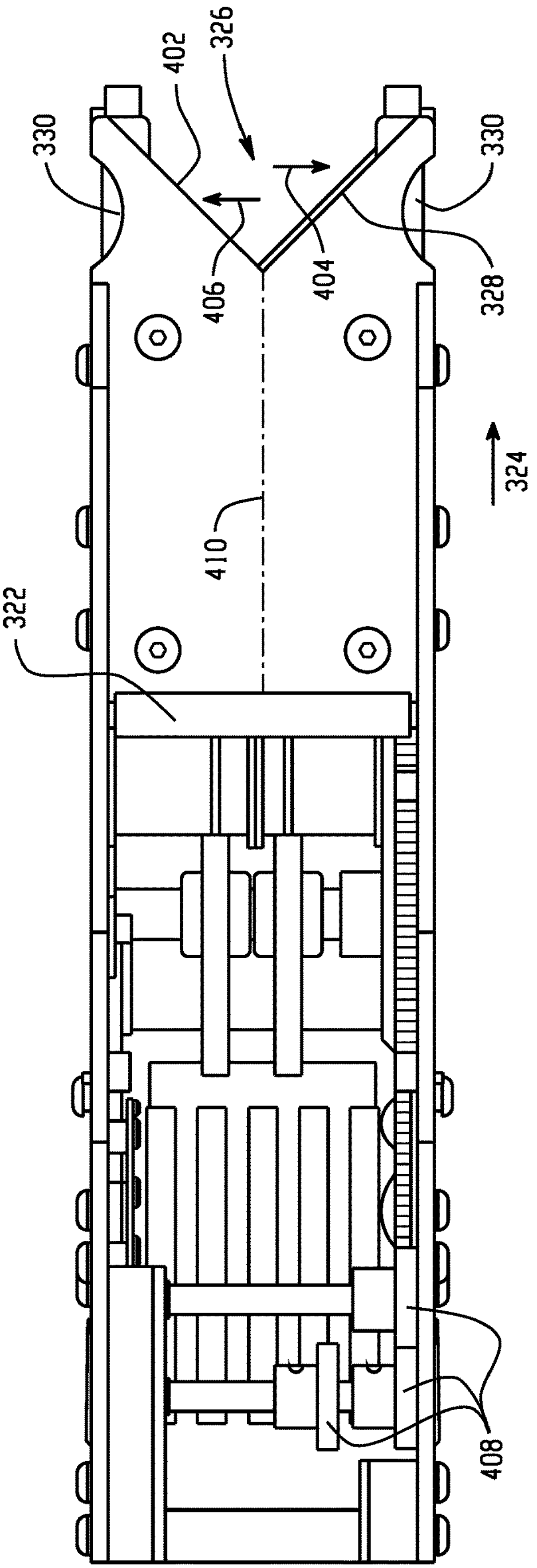
FIG. 4 is a diagram depicting a bottom view of the embodiment of the label applicator of FIG. 3.

FIG. 4 is a diagram depicting a bottom view of a label applicator. The label applicator is positioned (e.g., on a raised platform) such that the two part backing including the labels can travel from the scollop wheel in the first direction 324 toward the stripping point 326. FIG. 4 illustrates the stripper plate idler 322 that was described with reference to FIG. 3 but not shown, where the stripper plate idler 322 helps align the two part backing with labels with the first plate 328 of the stripping point 326. FIG. 4 illustrates an embodiment where the first plate 328 (and the second plate 332, not shown) include v-shaped portions 402.

As described above, at the stripping point 326, one of the sub-bellows of the bellows unit (not shown in FIG. 4) applies suction to a non-sticky side of a label to pull that label from the two part backing. The first strip and the second strip of the two part backing are directed, respectively over sides of the stripping-v of the first plate 328, such that the first strip is directed in a second direction 404 and the second strip is directed in a third direction 406. The second direction 404 (up in FIG. 4) is opposite the third direction 406 (down in FIG. 4), where both the second 404 and third 406 directions are perpendicular to the first 324 direction (and fourth direction 334 not shown in FIG. 4). In an embodiment, the second 404 and third 406 directions are opposite directions that are outward from a center line 410 of the label applicator. FIG. 4 further illustrates the transverse stripper rollers 330 configured to direct the first strip and the second strip from the first plate 328 to the second plate 332 (not shown in FIG. 4). FIG. 4 additional illustrates drive gears 408 for applying a turning force to one or more of a scollop wheel 320 and a sprocket wheel 338 for pulling the two part backing, labels, and first and second strips through the label applicator.

Figure 5:
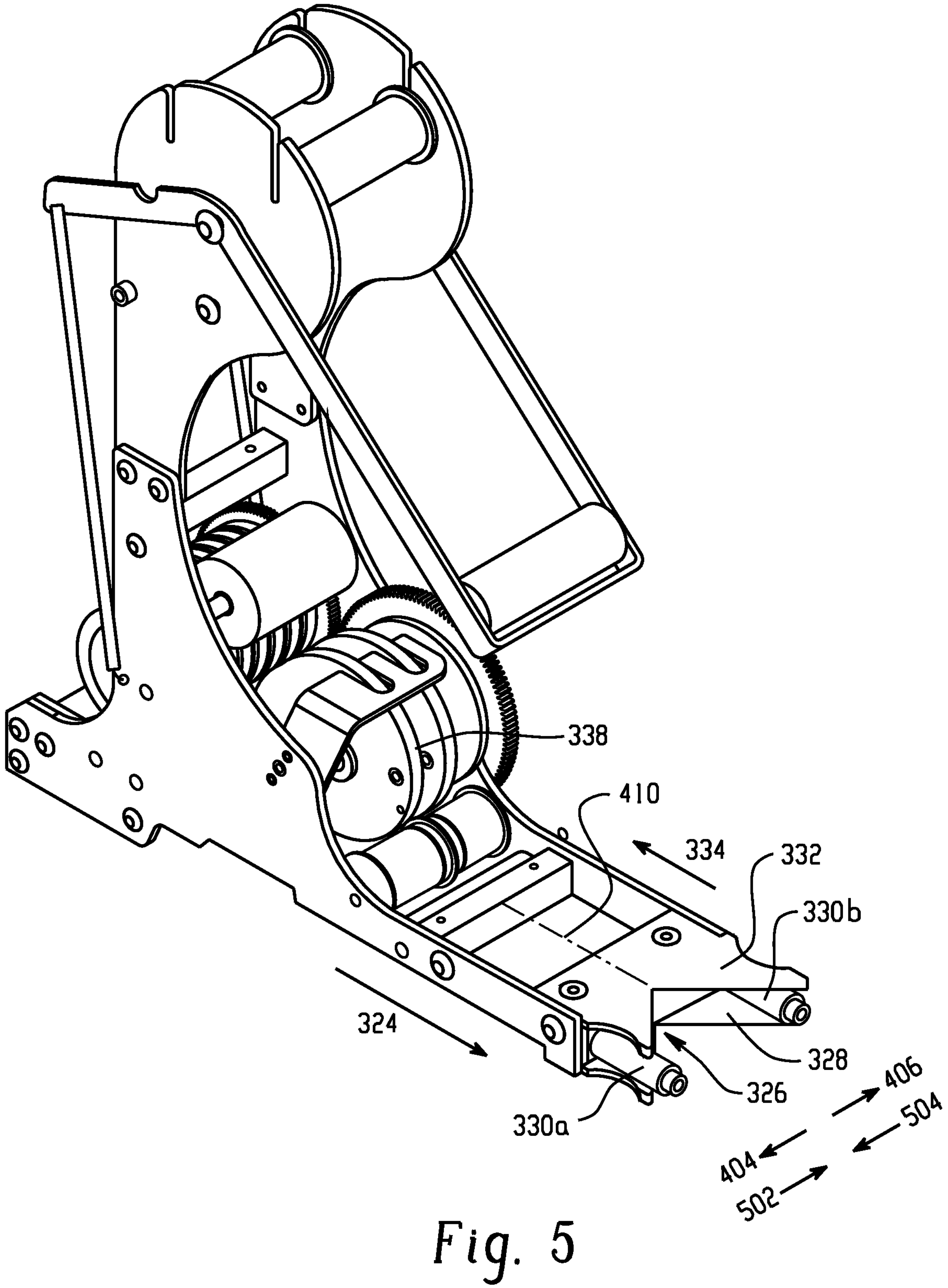
FIG. 5 is a diagram providing an additional view of the embodiment of the label applicator in FIG. 4 that shows the relative positioning of the first plate, the traverse stripper rollers, and the second plate at the stripping point.

FIG. 5 is a diagram providing an additional view of a label applicator that shows the relative positioning of the first plate, the transverse stripper rollers, and the second plate at the stripping point. As described above, the two part backing carrying labels travels along a bottom of the label applicator to the stripping point 326. At the stripping point, a sub-bellow of the bellows unit uses suction on the non-sticky side of a label to pull the label from the two part backing. That stripping process is aided by the first plate 328 having a v-shaped portion that directs a first strip of the two part backing in the second direction 404 using one leg of the v-shaped portion, while the other leg of the v-shaped portion directs the second strip in the third direction 406. The first strip is routed around the outside of first transverse stripper roller 330*a* (up in FIG. 5) to the bottom of the upper, v-shaped second plate 332. Similarly, the second strip is routed around the outside of second transverse stripper roller 330*b* (up in FIG. 5) to the bottom of the second plate 332. The first strip runs under the bottom of the second plate 332 (in a fifth direction 502 inward toward center line 410) to a first leg of the v-shaped upper plate 332, which directs the first strip in the fourth direction 334 toward the sprocket wheel 338. Similarly, the second strip runs under the bottom of the second plate 332 (in a sixth direction 504 inward toward center line 410) to a second leg of the v-shaped upper plate 332, which directs the first strip in the fourth direction 334 toward the sprocket wheel 338, where the fourth direction 334 is opposite the first direction 324 and is perpendicular to each of the second 404, third 406, fifth 502, and sixth 504 directions.

Figure 6:
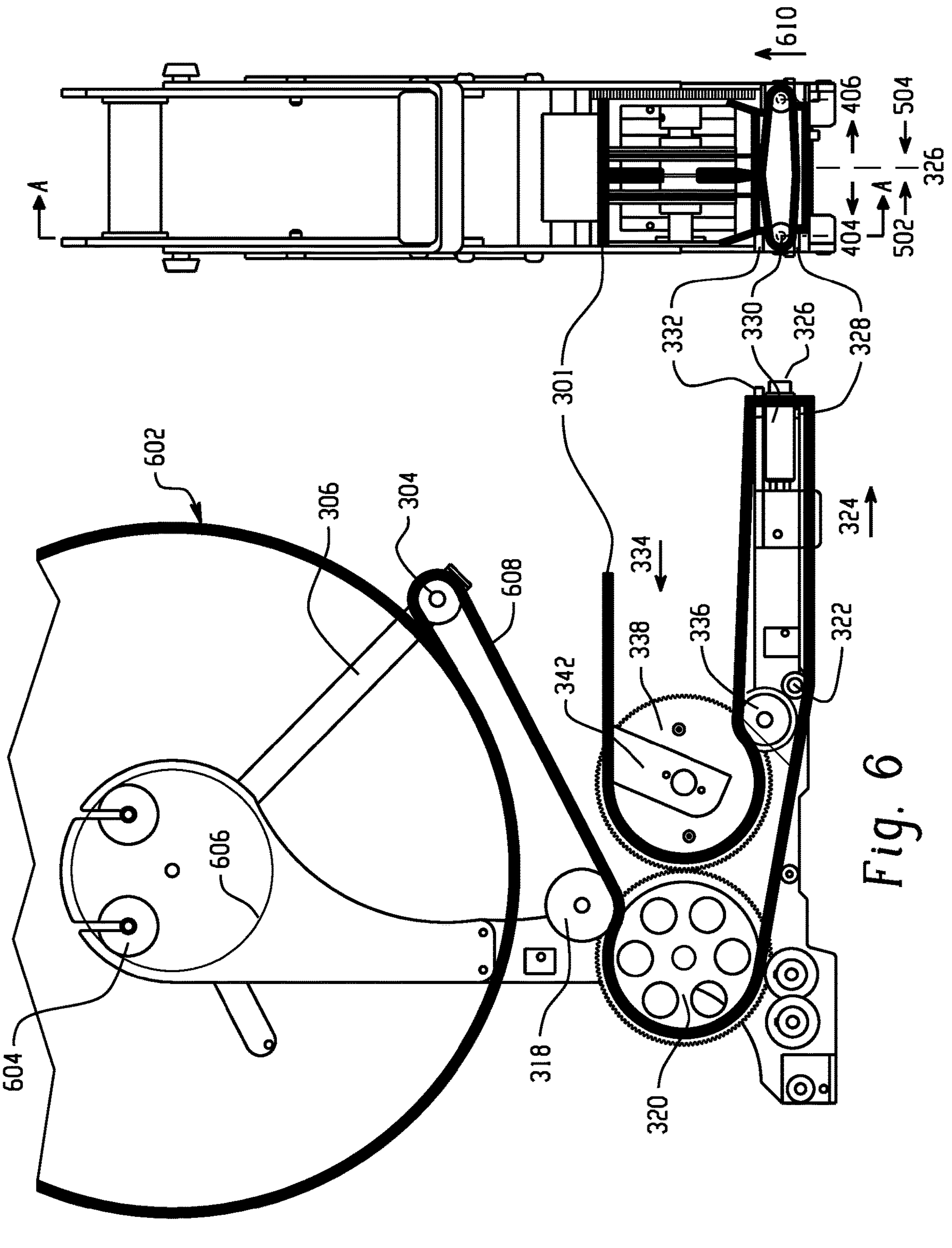
FIG. 6 is a diagram depicting a pathway of a two part backing carrying labels from a label reel to a stripping point, and subsequent pathways for the first and second strips after removal of labels.

FIG. 6 is a diagram depicting a pathway of two part backing/labels 608 from a label reel to a stripping point, and subsequent pathways for the first and second strips after removal of labels. The label applicator is shown from the side on the right and from the front on the left. The tape path along the label application is shown in dark thick line 301. The reel of labels 602 are supported by reel rollers 604 that interact with an inner surface of the label reel core 606. The two part backing/labels 608 is pulled over tensioning roller 304 that is supported by tension arm 306. A scallop wheel idler roller 318 ("nip roller") promotes a high degree (e.g., 180 degrees plus, 270 degrees) of contact between the two part backing/labels 608 and the scallop wheel 320, which may be powered to help drive the two part backing 608 and labels along the pathway. The two part backing/labels 608 runs under stripper plate idler 322 for alignment with the stripping point 326. The stripping point comprises a v-shaped first plate 328 for directing the first strip and the second strip in directions 404, 406 respectively after removal of the label; a pair of transverse stripper rollers 330 for directing the first strip and the second strip up 610, and a v-shaped second plate 332 for directing the first strip and the second strip in directions 502, 504 respectively prior to those strips being directed in fourth direction 334 toward the tape control roller 336 and the sprocket wheel 338. The waste tape stripper 342 directs the first and second strips away from other components of the label applicator for disposal.

Figure 7:
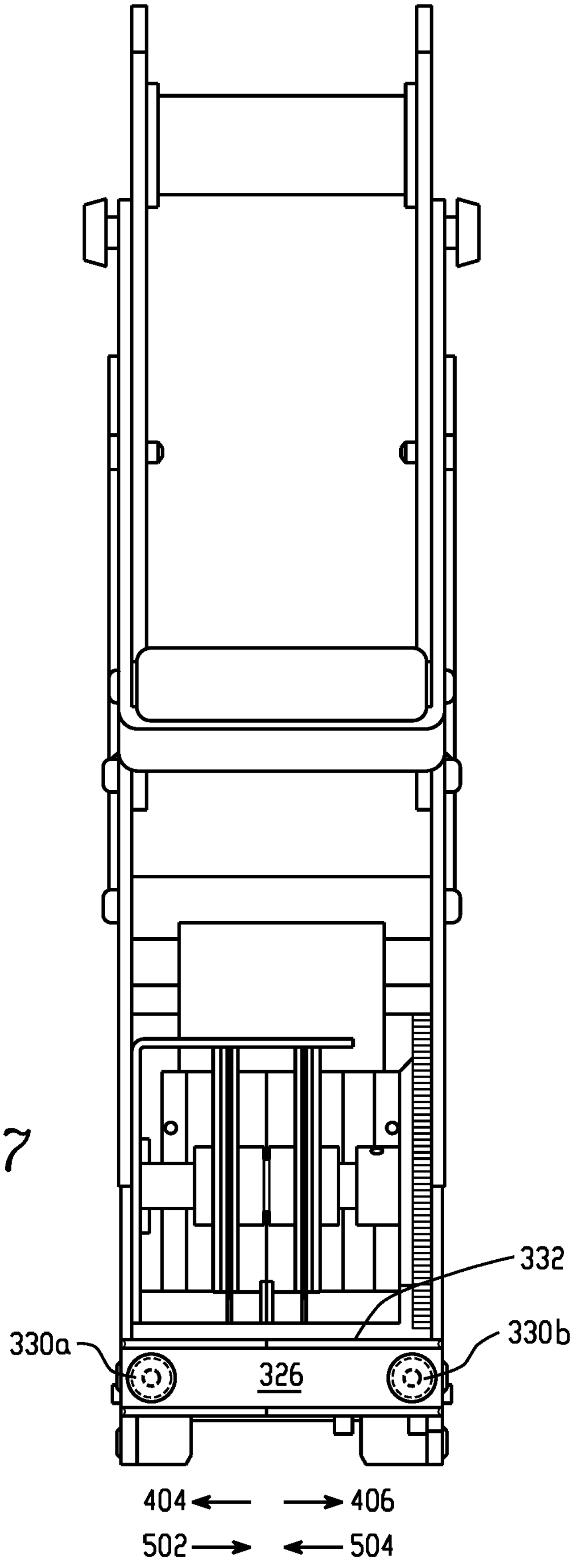
FIG. 7 is a diagram depicting a front view of a label applicator, particularly displaying a stripping point.

FIG. 7 is a diagram depicting a front view of a label applicator, particularly displaying a stripping point. The stripping point 326 includes a first plate 328 that aids in removal of the two part backing from the label. The v-shaped first plate 328 directs the first strip in the second direction 404 and the second strip in the third direction 406. The first strip runs around the outside of the first transverse stripper roller 330*a* and under the second plate 332 in the fifth direction 502 toward the center line of the label applicator. Similarly, the second strip runs around the outside of the second transverse stripper roller 330*b* and under the second plate 332 in the sixth direction 504 toward the center line. The v-shaped second plate transitions the first and second strips from under the second plate 332 to above the second plate 332, transitioning the first and second strips to travel in the fourth direction.

Figure 8:
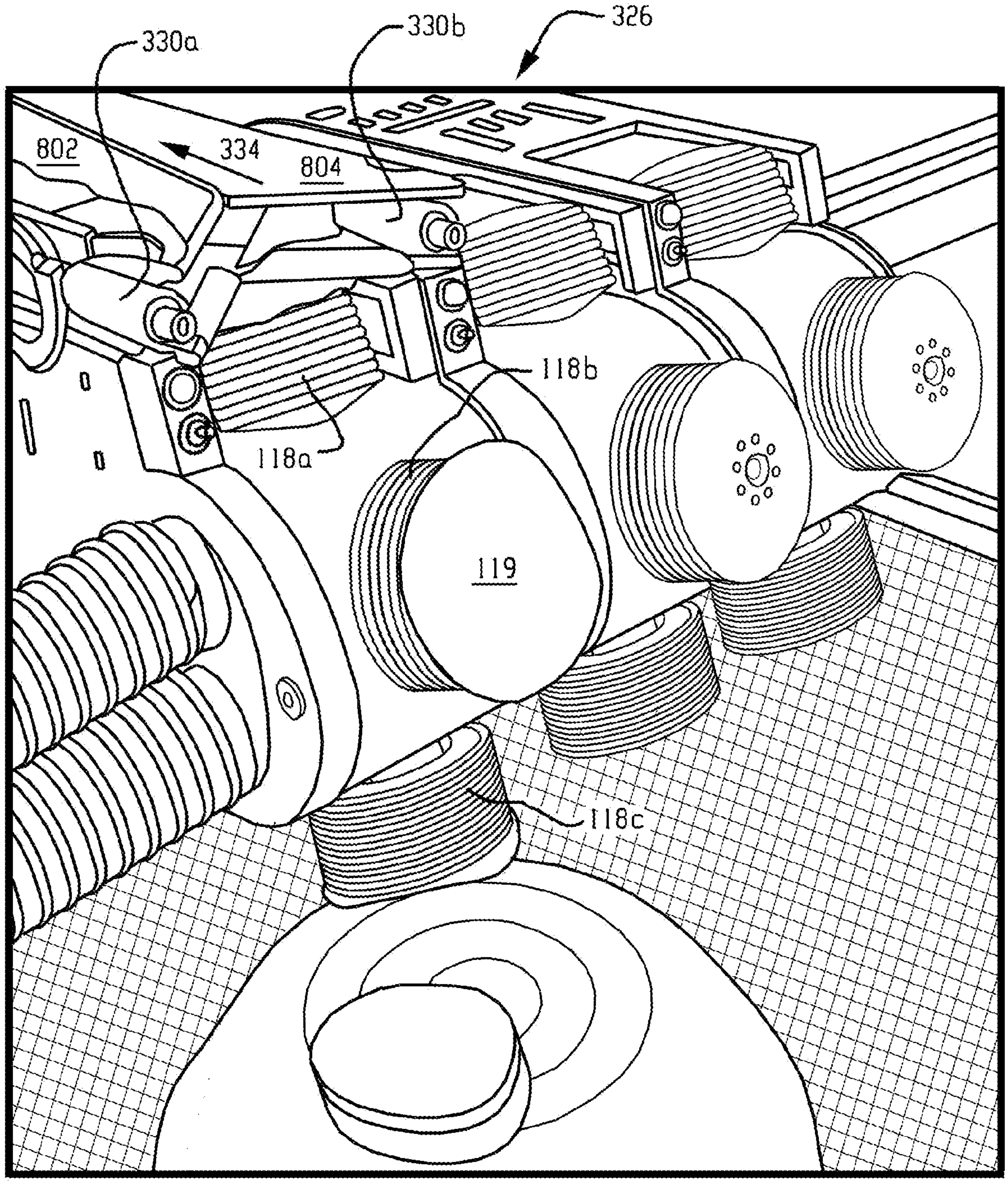
FIG. 8 is a diagram depicting a label applicator stripping point having first and second strips of a two part backing.

FIG. 8 is a diagram depicting a label applicator stripping point including first 802 and second strips 804 of a two part backing. In FIG. 8, sub-bellow 118*a* is removing a label from the two part backing, while another sub-bellow 118*b*, having already removed a label 119 from the backing, is transitioning to a bottom label application position. A third sub-bellow 118*c* has a label ready for application. FIG. 8 depicts the path of the first and second strips after they are peeled from labels via suction from the sub-bellow and the direction change of the first plate. The first strip 802 and the second strip 804 are pulled away from a center line of the label applicator via the legs of the bottom, first plate. The first strip is run from the top of the first plate, around the outside of the first transverse stripper roller 330*a*, and under the top, second plate toward the center line of the label applicator. Likewise, the second strip 804 is run from the top of the first plate, around the outside of the second transverse stripper roller 330*b*, and under the top, second plate toward the center line of the label applicator. In transitioning from a bottom to a top of the second plate, the first strip 802 and the second strip 804 are pulled evenly in the fourth direction 334.

Figure 9:
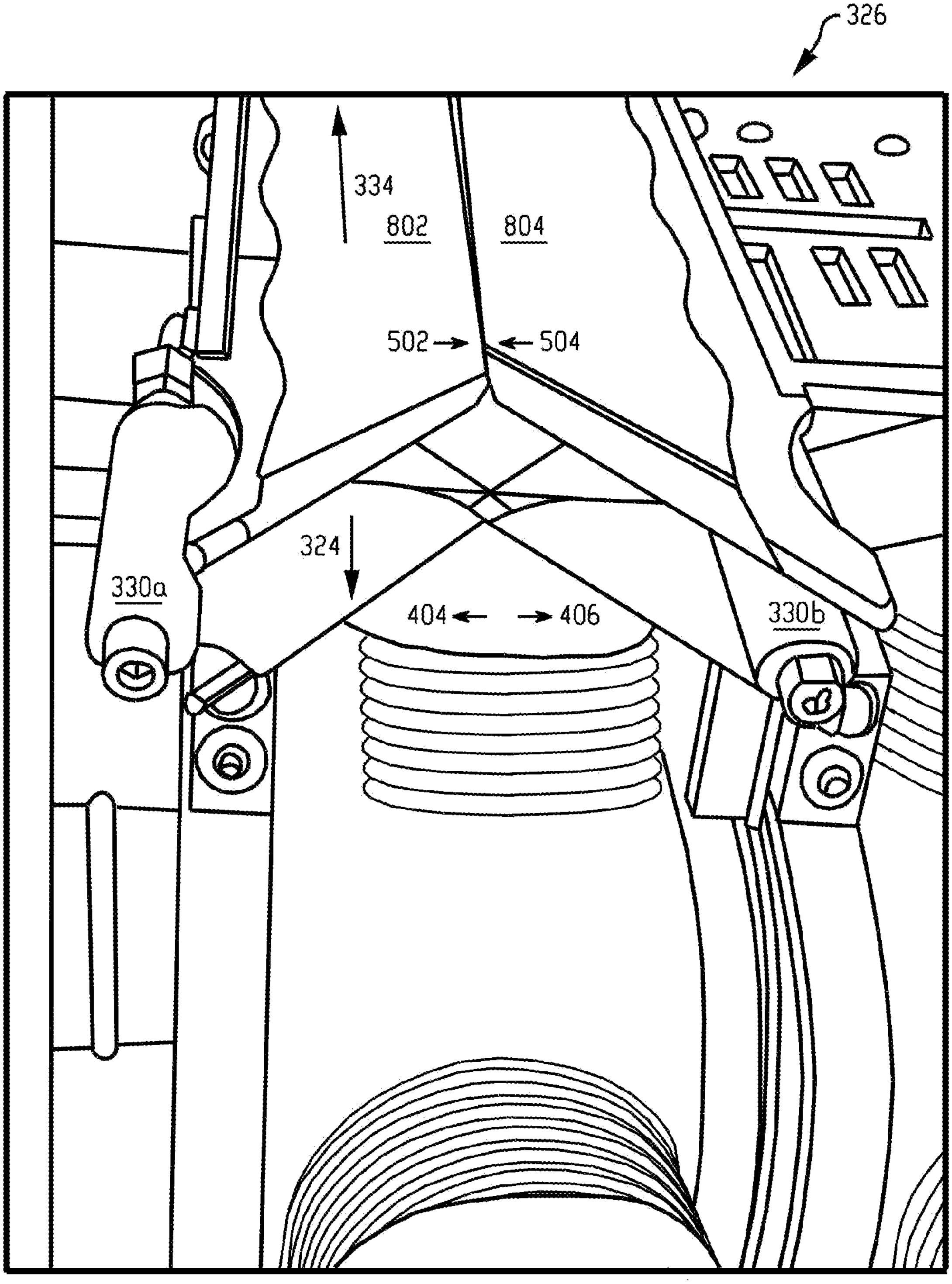
FIG. 9 provides a further view of a label applicator stripping point.

FIG. 9 provides a further view of a label applicator stripping point. The stripping point 326 comprises a v-shaped first plate 228 for directing the first strip 802 and the second strip 804 from direction 324 to directions 404, 406 respectively after removal of the label. A pair of transverse stripper rollers 330*a*, 330*b* are configured to direct the first strip 802 and the second strip 804, respectively up to the second plate 332. A v-shaped upper, second plate directs the first strip and the second strip in directions 502, 504 respectively prior to those strips being directed in fourth direction 334 toward the tape control wheel and the sprocket wheel for disposal.

Figure 10:
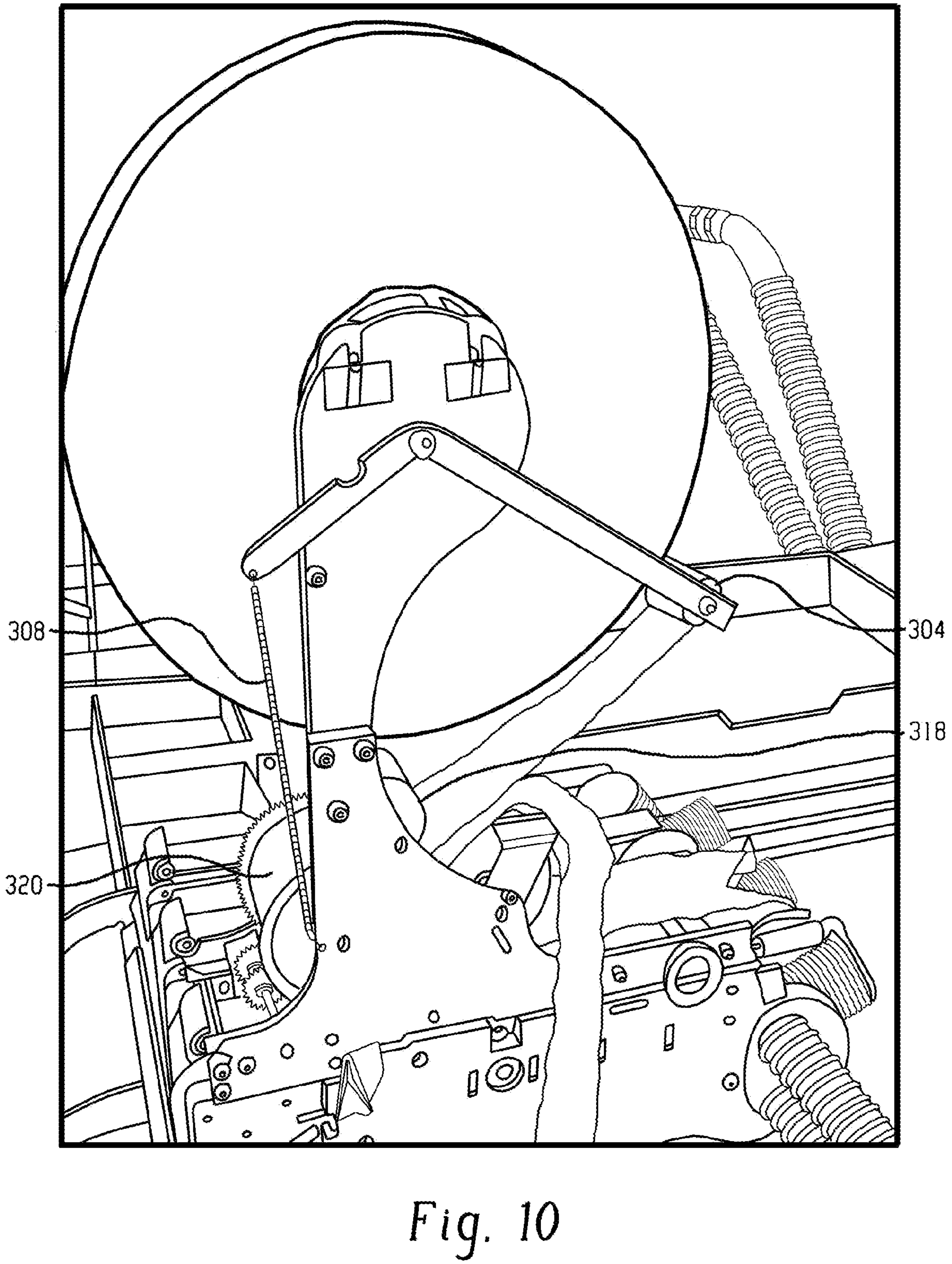
FIGS. 10 and 11 depict the tensioning roller in differing positions.
Figure 11:
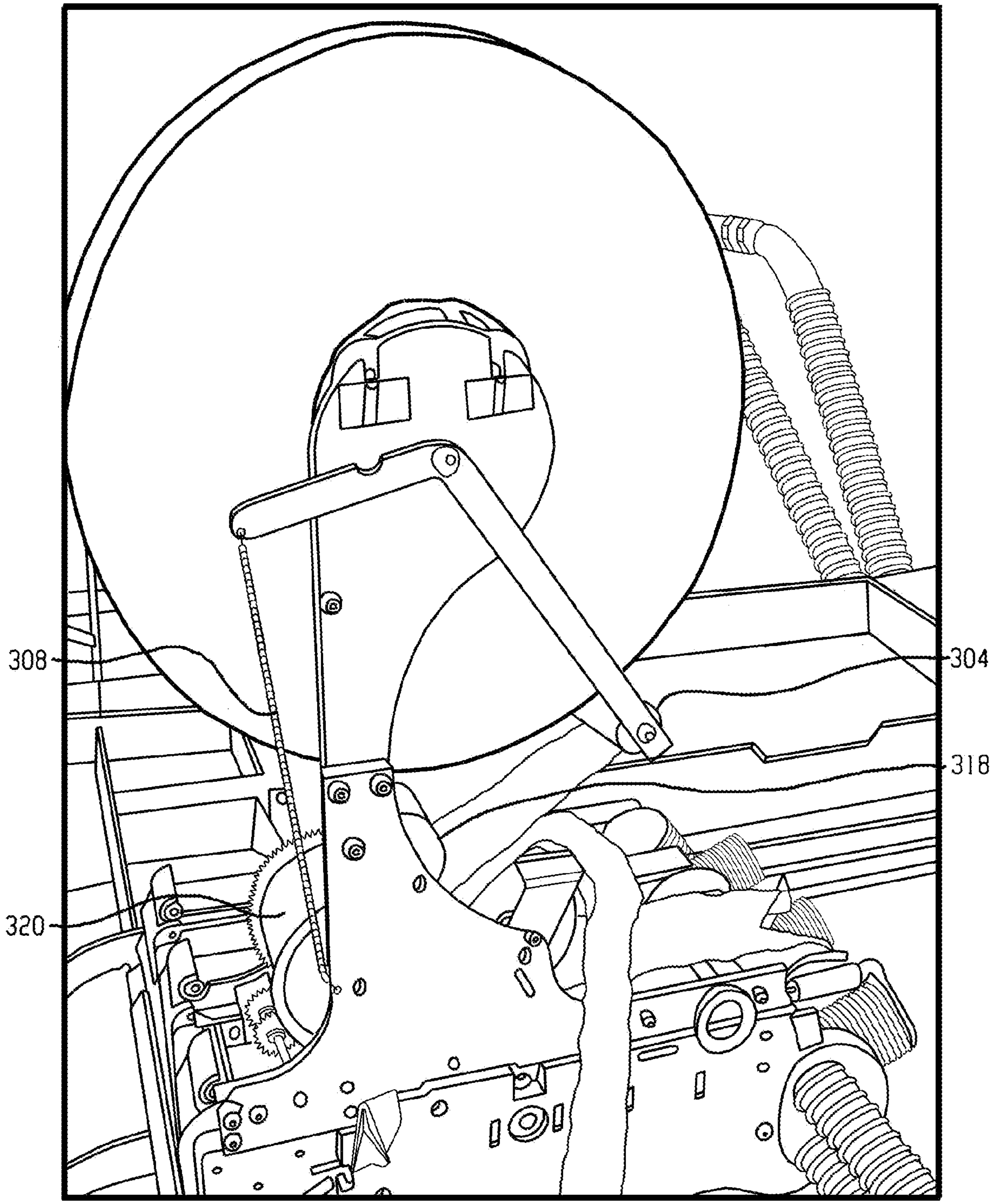

FIGS. 10 and 11 are diagrams depicting the tensioning roller in differing positions. FIG. 10 depicts the tensioning roller 304 being pulled by the tension arm spring 308 into a higher position relative to that depicted in FIG. 11. Due to the intermittent nature of label application, in some embodiments, the level of tension applied to tensioning roller 304 by the two part backing carrying the labels may fluctuate. The tensioning roller 304, as guided by the tension arm spring 308, maintains a consistent tension of the two part backing/labels as they traverse the scollop wheel idler roller 318 and scollop wheel 320, avoiding slippage or tangling of the two part backing/labels.

Figure 12:
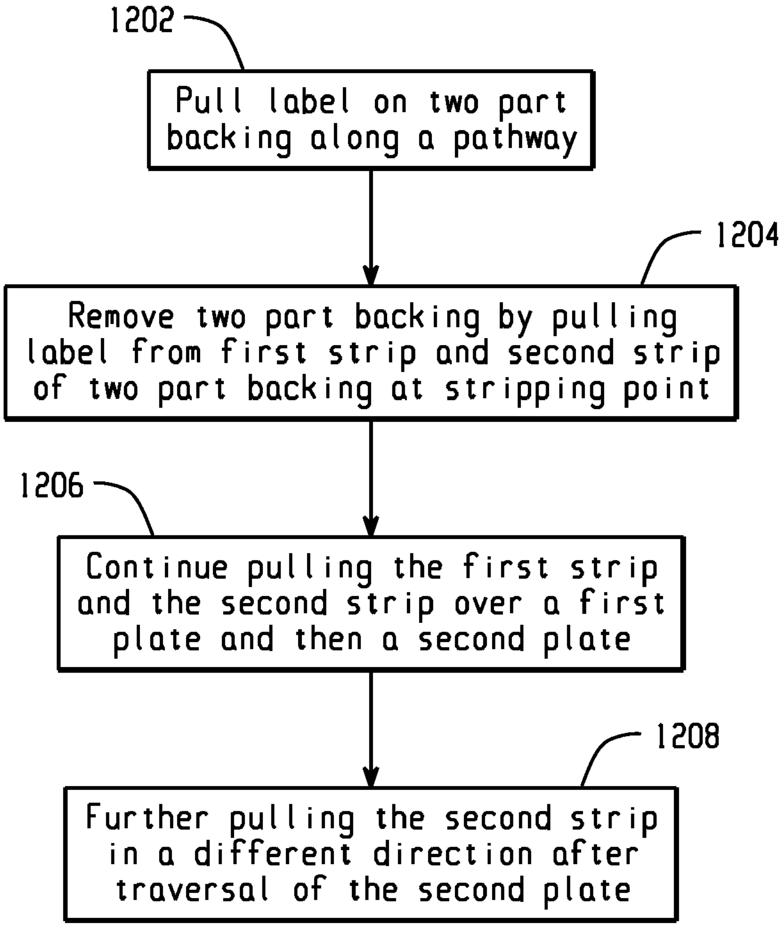
FIG. 12 is a diagram depicting a method of applying labels to food products.

FIG. 12 is a diagram depicting a method of applying labels to food products. At 1202, a label on two part backing is pulled along a pathway comprising one or more rollers to a stripping point in a first direction, the two part backing comprising a first strip and a second strip. At 1204, the two part backing is removed from the label by pulling the label from the first strip and the second strip at the stripping point using suction. At 1206, the first strip and the second strip are further pulled over a first plate to direct the first strip in a second direction and the second strip in a third direction, the second and third directions being different from the first direction. At 1208, the first strip and the second strip are further pulled over a second plate that is configured to further direct the first strip and the second strip in a fourth direction that is different than any of the first direction, the second direction, and the third direction.

Figure 13:
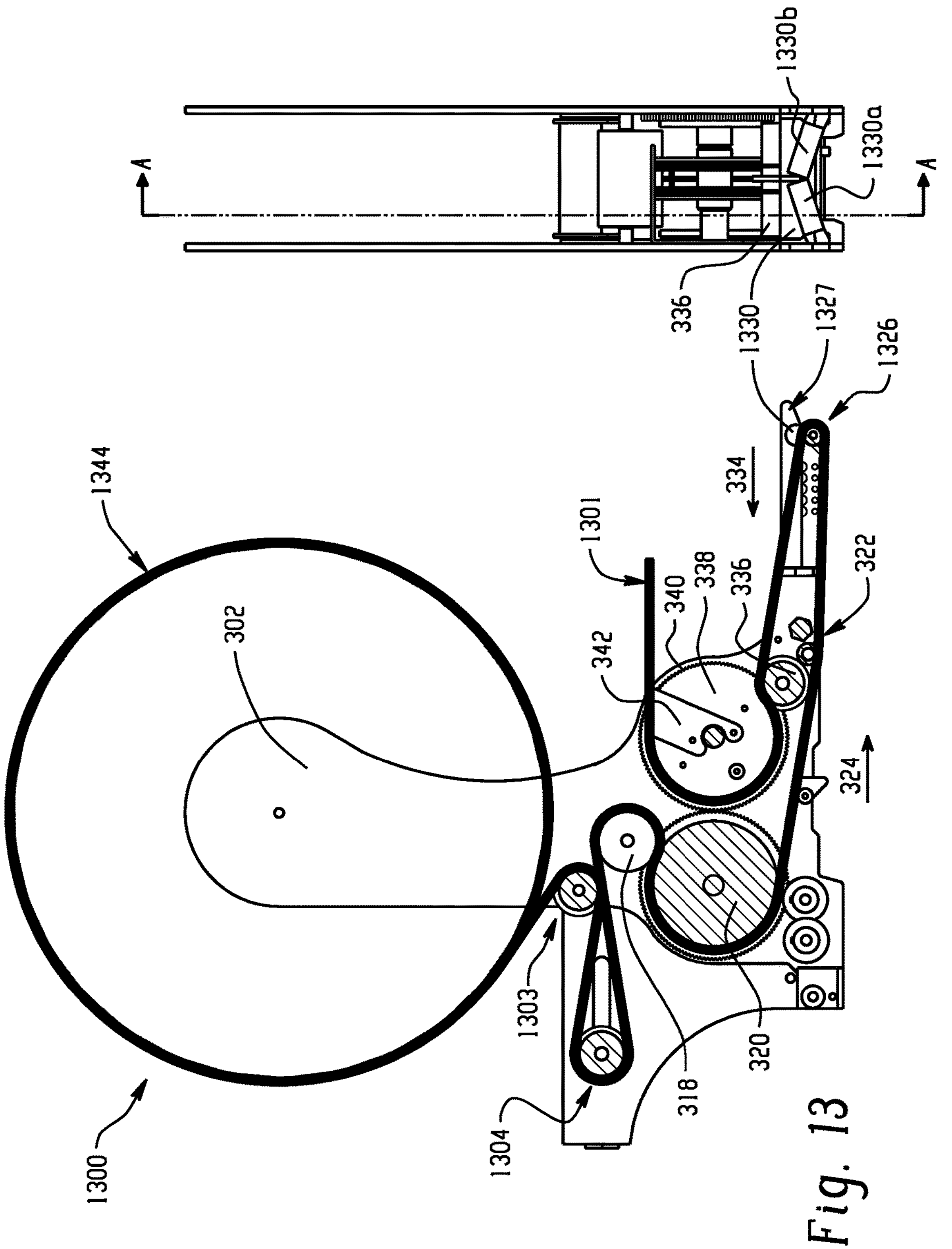
FIG. 13 is a diagram depicting one embodiment of a label applicator comprising two angled nose rollers for transiting a label on two part backing from a label reel.

FIG. 13 is a diagram depicting another embodiment of a label applicator. The embodiment in FIG. 13 comprises one or more rollers for transiting a label on a two part backing from a label reel 104, wherein the one or more rollers are angled nose rollers 1330. The label applicator 1300 includes a side plate 302 of a label reel receptacle (not shown, view blocked by label reel 104). The label reel receptacle is configured to receive a reel of labels 1344 on two part backing. The tape path along the label application is shown in dark thick line 1301. The labels on the two part backing are fed around a tension idler roller 1303 and a tensioning roller 1304. The tensioning roller 1304 is configured to maintain tension on the two part backing along the pathway. Tension is applied by a tape tension spring (not visible from shown angle) that maintains a substantially constant tension of the two part backing/labels along the pathway.

Following traversal of the tensioning roller 1304, the two part backing/labels runs under a scollop wheel idler roller 318 (e.g., a nip roller), over a scollop wheel 320 (e.g., a roller with scollop shape profile to guide the two part backing carrying labels or other texture for improving grip on the two part backing and labels). As described herein, the two part backing paper may optionally be cut into a scollop pattern, e.g., to be matched with a corresponding scollop pattern on the scollop wheel, enabling the scollop wheel to apply a pulling force on the backing paper. The target tension of the tensioning roller 1304 via tape tension spring 308 can be implemented to maximize the surface of interaction of the two part backing/labels with the scollop wheel idler roller 318 and/or the scollop wheel 320 to prevent slippage between those rollers 318, 320 and the two part backing/labels. In an embodiment, the two part backing then travels under a stripper plate idler 322 in a first direction (indicated at 324) before traversing two angled nose rollers 1330 (1330*a* and 1330*b*) reaching a stripping point 1326, where the stripper plate idler 322 and alignment projection 1327 can aid in aligning the two part backing and labels with the two angled nose rollers 1330, which act as a stripping point 1326. At the angled nose rollers 1330, the two part backing/labels interacts with a sub-bellow to remove a label from the two part backing using suction from the sub-bellow on the non-sticky side such that the sub-bellow can then apply the sticky side of the label to a food product.

Following traversal of the angled nose rollers 1330 (1330*a* and 1330*b*), the first strip and the second strip, now separated from the label, are directed in another direction 334 that is opposite the first direction 324 toward a sprocket wheel 338, e.g., for disposal. Specifically, the first strip and the second strip travel over a tape control roller 336 and under a sprocket wheel 338. The sprocket wheel 338 may be driven by a motor that interacts with a sprocket wheel drive gear 340 of the sprocket wheel 338, where that motor and sprocket wheel drive gear 340 are configured to pull the two part tape through the label applicator (e.g., continuously if the presence of food product for labeling can be consistently and reliably reproduced, in an intermittent manner including periodic pauses while waiting for food product to reach its labeling position). In embodiments, as depicted in FIG. 13, the sprocket wheel 338 includes protrusions (e.g., teeth) for piercing each of the first and second strips to provide that pulling force on the strips after the label is removed, and further on the two part backing carrying the labels prior to the labels reaching the angled nose rollers 1330 (1330*a* and 1330*b*) and stripping point 1326. The label applicator may further include a waste tape stripper 342 for deflecting the first and second strips toward away from other portions of the label applicator toward a disposal point (e.g., one or more disposal rolls, a disposal bin) to avoid tangling with other mechanisms of the label applicator. In an embodiment, upon loading of a new label reel, the two part backing with labels is routed (e.g., manually) through the path 1303, 1304, 318, 320, in direction 324 to the stripping point 1326 and angled nose rollers 1330 (1330*a* and 1330*b*), with the first strip and the second strip then being further routed in direction 334 over tape control roller 336 to the sprocket wheel 338, separated by the alignment projection 1327, where the first and second strips are pierced such that they can then be automatically pulled evenly by the sprocket wheel 338.

Figure 14:
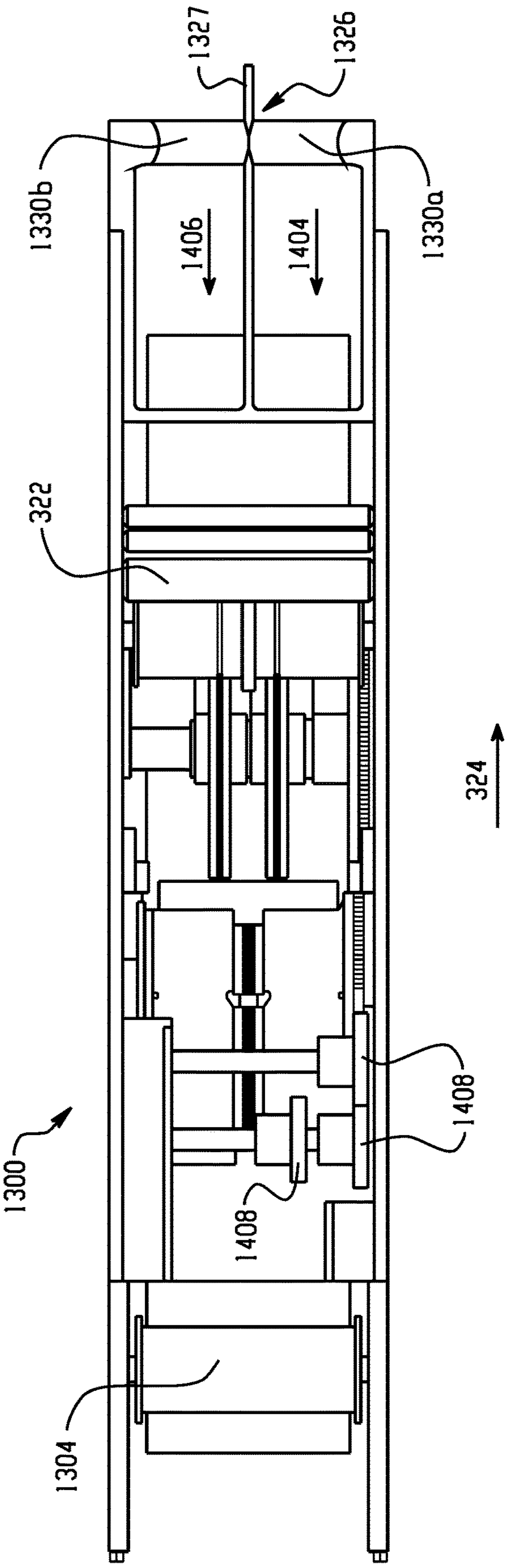
FIG. 14 is a diagram depicting a bottom view of the embodiment of the label applicator of FIG. 13.

FIG. 14 is a diagram depicting a bottom view of the label applicator from FIG. 13. The label applicator is positioned (e.g., on a raised platform) such that the two part backing/labels can travel from the tensioning roller 1304 in the first direction 324 toward the angled nose rollers 1330*a*, 1330*b*. FIG. 14 illustrates the stripper plate idler 322 and alignment projection 1327 that helps align the two part backing with labels with the angled nose rollers 1330*a*, 1330*b* of the stripping point 1326. As described above, at the stripping point 1326, one of the sub-bellows of the bellows unit (not shown in FIG. 14) applies suction to a non-sticky side of a label to pull that label from the two part backing. The first strip and the second strip of the two part backing are directed, respectively over each of the angled nose rollers 1330*a*, 1330*b*, such that the first strip is directed along a first strip pathway 1404 in a direction opposite the first direction 334 and the second strip is directed along a second strip pathway 1406 in a direction opposite the first direction 334. Alignment projection 1327 is positioned between the first strip pathway 1404 and second strip pathway 1406. Advantageously, angled nose rollers help minimize overall friction between the two part backing strips and the various elements of the label applicator and keeps the power needed to operate the label applicator within the capabilities of standard motor and drive electronics. FIG. 14 additional illustrates drive gears 1408 for applying a turning force to one or more of a scollop wheel and a sprocket wheel for pulling the two part backing, labels, and first and second strips through the label applicator.

Figure 15:
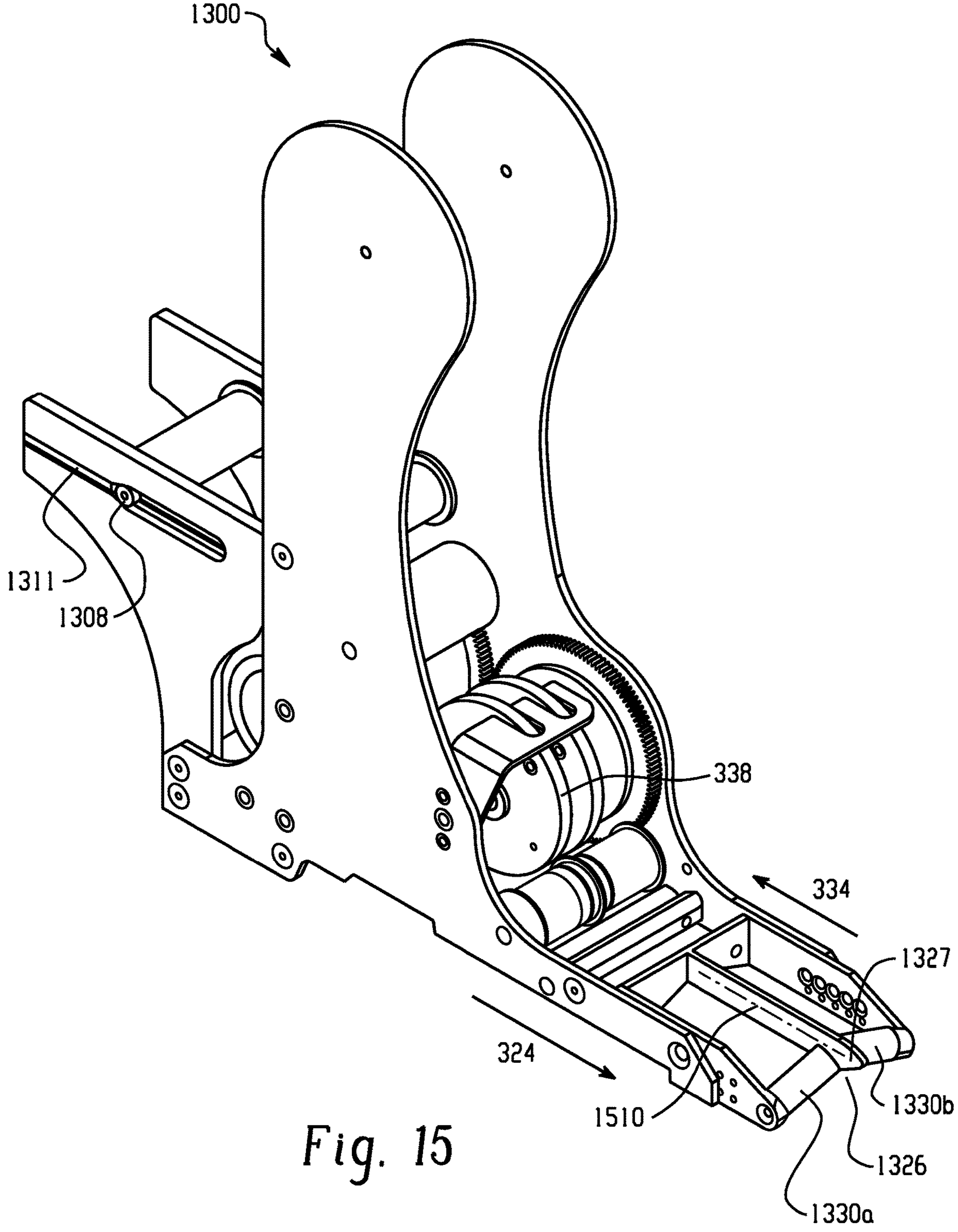
FIG. 15 is a diagram providing an additional view of the embodiment of the label applicator in FIG. 13 that shows the relative position of the angled nose rollers and the tape tension spring(s) and tape tension slide to adjust tension on the tape.

FIG. 15 is a diagram providing an additional view of a label applicator, particularly the relative position of the angled nose rollers. As described above, the two part backing/labels travels along a bottom of the label applicator to the stripping point 1326, wherein alignment of the two-part backing carrying labels is aided by the alignment projection 1327. At the stripping point 1326, a sub-bellow of the bellows unit uses suction on the non-sticky side of a label to pull the label from the two part backing. The first strip is routed around the outside of first angled nose roller 1330*a* (up in FIG. 15). Similarly, the second strip is routed around the outside of second angled nose roller 1330*b* (up in FIG. 15). While the depicted view in FIGS. 13 and 14 did not depict the angled nose rollers as angled, in FIG. 15, the angled nose rollers 1130*a*, 1330*b* are angled downward from a center line 1510 at an angle of about 15° to about 35° to facilitate the removal of the labels from the two part backing. The first strip runs between the tape control roller 336 under the sprocket wheel 338. Similarly, the second strip runs between the tape control roller 336 under the sprocket wheel 338. A tape tension spring 1308 maintains tension on the two part backing along the pathway. The level of tension is applied by a tape tension slide 1311 that maintains a substantially constant tension of the two part backing along the pathway.

Figure 16:
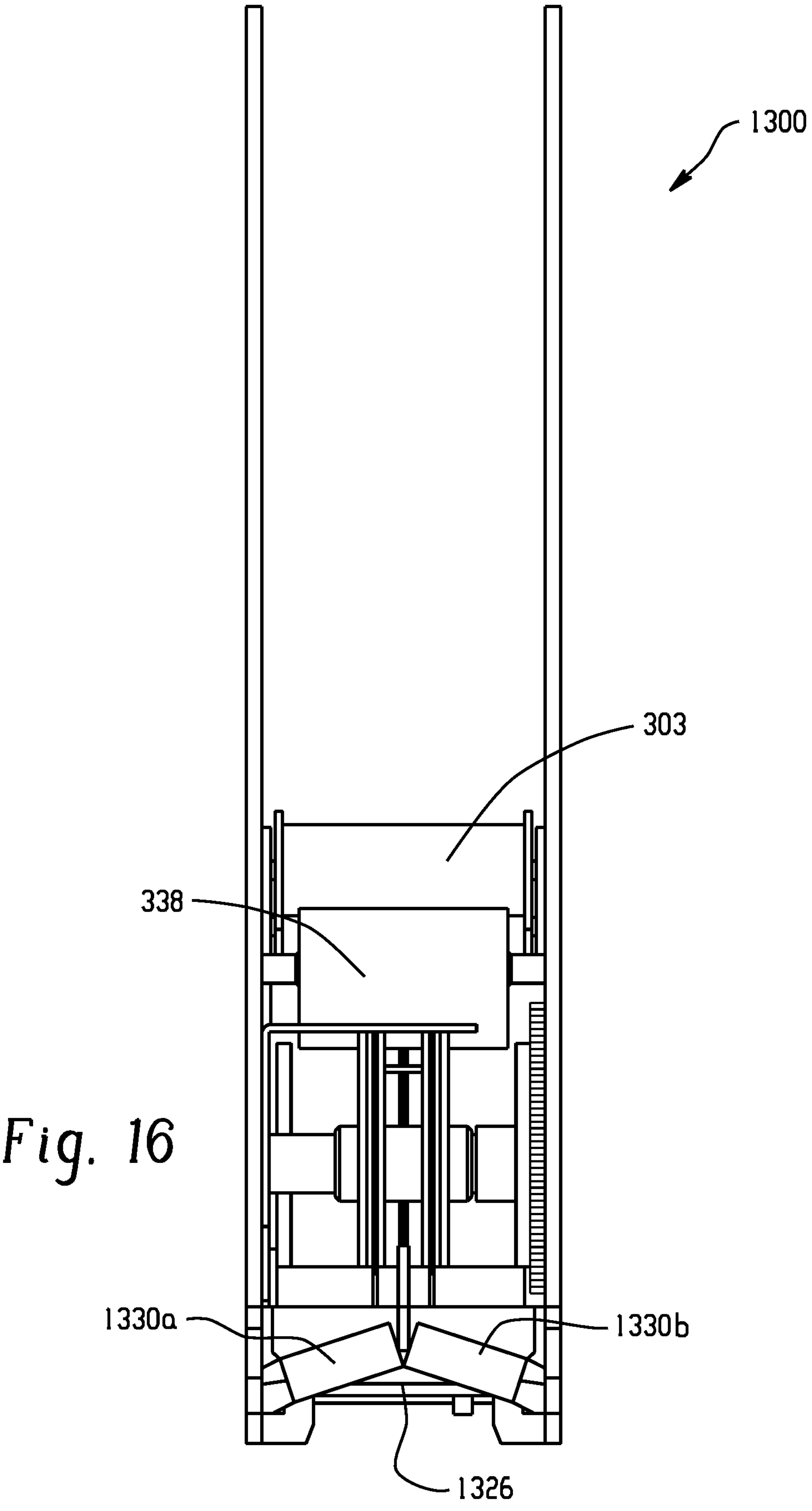
FIG. 16 is a diagram depicting a front view of the embodiment of the label applicator in FIG. 13, particularly displaying two angled nose rollers.

FIG. 16 is a diagram depicting a front view of a label applicator. The tape tension idler roller 303 is depicted as is the sprocket wheel 338. The stripping point 1326 includes a first angled nose roller 1330*a* and a second angled nose roller 1330*b* that aids in removal of the two part backing from the label. The first strip runs around the outside of the first angled nose roller 1330*a* and the second strip runs around the outside of the second angled nose roller 1330*b*.

Figure 17:
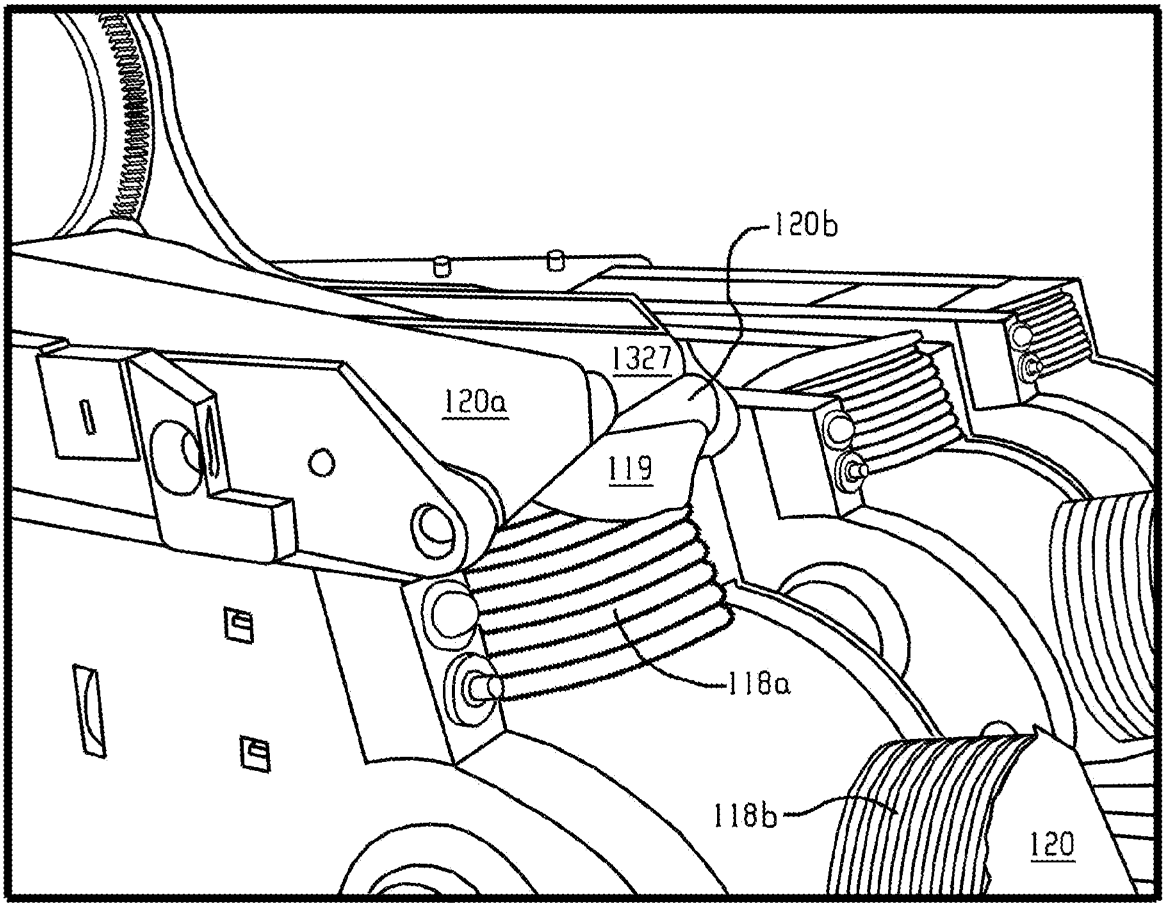
FIG. 17 provides a further view of a label applicator stripping point.
Figure 18:
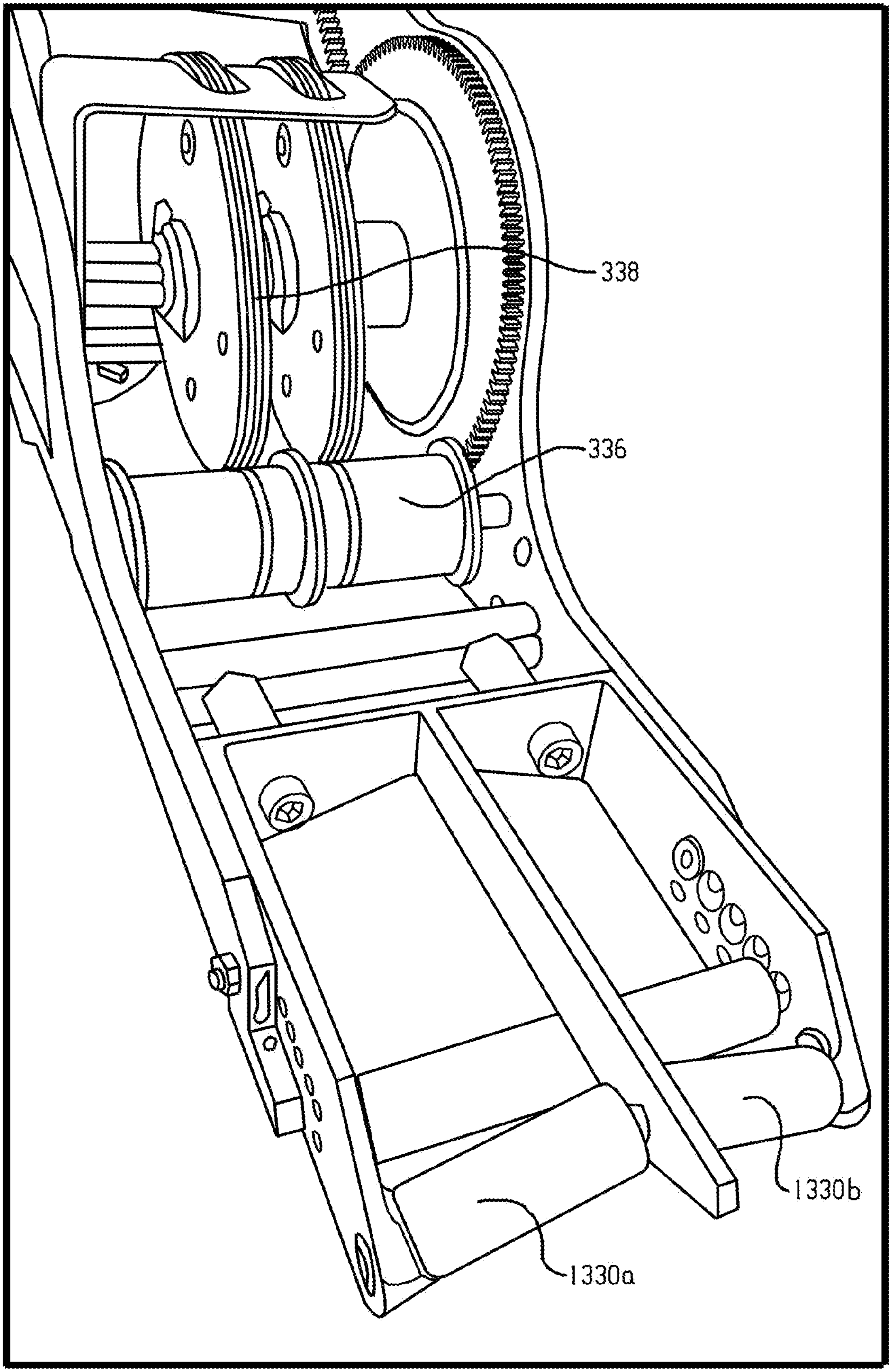
FIG. 18 depicts the embodiment of the label applicator in FIG. 13 for applying labels to food products.

FIG. 17 is a diagram depicting a label applicator stripping point having first and second strips of a two part backing. In FIG. 18, sub-bellow 118*a* is removing a label 119 from the two part backing (first strip 120*a* is shown) while sub-bellow 118*b* has removed a label 120 from the backing and is transitioning to a bottom label application position. A third sub-bellow 118*c* has a label ready for application. FIG. 18 depicts the path of the first strip 120*a* and second strip 120*b* after they are peeled from labels via suction from the sub-bellow. The first strip 120*a* and the second strip 120*b* are pulled backwards along a center line, with the aid of an alignment projection 1327, of the label applicator.

FIG. 18 provides a further view of a label applicator. A pair of angled nose rollers 1330*a*, 1330*b* are configured to direct a first strip and a second strip of a two part backing back towards the tape control roller 336 to between the tape control roller and the sprocket wheel 338.

Although the disclosure has been described in detail for the purpose of illustration based on what are currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system for applying labels to food products, comprising:

a label applicator comprising:

a pathway comprising one or more rollers configured for transiting a label on two part backing from a reel to a stripping point in a first direction, the two part backing comprising a first strip and a second strip;

wherein the stripping point comprises:

a first plate for removing the two part backing from the label and directing the first strip in a second direction and the second strip in a third direction, the second and third directions being different from the first direction;

a second plate that is configured to further direct the first strip and the second strip in a fourth direction that is different than any of the first direction, the second direction, and the third direction.

2. The system of claim 1, wherein the two part backing is held together along the pathway by the label, wherein the label has a sticky side that interfaces with both the first strip and the second strip while on the pathway.

3. The system of claim 1, wherein the second and third directions are opposite one another, wherein the fourth direction is opposite the first direction.

4. The system of claim 1, wherein the first strip and the second strip are transported in the fourth direction for disposal.

5. The system of claim 1, wherein the stripping point further comprises a first stripper roller for directing the first strip between the first plate and the second plate, and a second stripper roller for directing the second strip between the first plate and the second plate.

6. The system of claim 5, wherein the first plate and the second plate both include v-shaped portions for changing a direction of the first strip and the second strip.

7. The system of claim 5, wherein the first plate is configured to transition the first strip and the second strip from the first direction to the second and third directions which are opposite outward directions from a center line of the label applicator; wherein the first and second stripper rollers are configured to direct the first and second strips in an upward direction and then opposite inward directions toward the center line to the second plate; wherein the second plate is configured to transition the first strip and the second strip from the opposite inward directions to the fourth direction.

8. The system of claim 1, wherein the two part backing is moved along the pathway by a drive roller that pulls the first strip and the second strip evenly in the fourth direction.

9. The system of claim 8, wherein the first strip and the second strip are pierced by the drive roller to enable said pulling.

10. The system of claim 1, further comprising:

a reel receptacle configured to receive the reel of labels on the two part backing;

wherein the pathway comprises a tensioning roller configured to maintain tension on the two part backing along the pathway from the reel to the stripping point.

11. The system of claim 10, further comprising a spring that applies a force to the tensioning roller for maintaining a substantially constant tension of the two part backing along the pathway, wherein the tensioning roller is mounted at a radius from the center of the reel receptacle that is greater than a radius of a full reel.

12. The system of claim 10, wherein the pathway further comprising a scollop wheel, a nip roller, and a tape control roller between the tensioning roller and the stripping point.

13. The system of claim 1, further comprising a bellows unit, wherein the bellows unit is configured to pull the label from the two part backing at the stripping point using suction.

14. The system of claim 13, wherein the bellows unit comprises a plurality of rotating sub-bellows, each sub-bellow being configured to extract single labels from the two part backing using suction and to apply single labels to food products via release of said suction.

15. The system of claim 14, wherein a particular sub-bellow is configured to remove the label by applying suction to a non-sticky side of the label to remove the label from the two part backing at a first position, wherein the particular sub-bellow is configured to be rotated to a second position, and wherein the particular sub-bellow is configured to apply the label to a particular food product upon detection of the particular food product at the particular sub-bellow in the second position.

16. The system of claim 15, wherein the particular sub-bellow is configured to be extended when applying the label to the particular food product.

17. The system of claim 1, wherein the system comprises a plurality of label applicators arranged so as to label multiple food products contained within a single container simultaneously.

18. The system of claim 1, wherein the food products comprise produce.

19. A method of applying labels to food products, comprising:

pulling a label on two part backing along a pathway comprising one or more rollers to a stripping point in a first direction, the two part backing comprising a first strip and a second strip;

removing the two part backing from the label by pulling the label from the first strip and the second strip at the stripping point using suction;

continuing to pull the first strip and the second strip over a first plate to direct the first strip in a second direction and the second strip in a third direction, the second and third directions being different from the first direction;

further pulling the first strip and the second strip over a second plate that is configured to further direct the first strip and the second strip in a fourth direction that is different than any of the first direction, the second direction, and the third direction.

20. The method of claim 19, further comprising directing the first strip from the first plate to the second plate using a first stripper roller; and directing the second strip from the first plate to the second plate using a second stripper roller.

21. A system for applying labels to food products, comprising:

a label applicator comprising:

a pathway comprising one or more rollers configured for transiting a label on two part backing from a reel to a stripping point in a first direction, the two part backing comprising a first strip and a second strip;

wherein the stripping point comprises:

two angled nose rollers for removing the two part backing from the label and directing the first strip along a first strip pathway in a direction opposite from the first direction and the second strip along a second strip pathway opposite from the first direction.

22. The system of claim 21, wherein the two part backing is held together along the pathway by the label, wherein the label has a sticky side that interfaces with both the first strip and the second strip while on the pathway.

23. The system of claim 21, wherein the first strip and the second strip are transported along a first strip pathway and second strip pathway, respectively, for disposal.

24. The system of claim 21, wherein the stripping point further comprises an alignment projection positioned between the along a first strip pathway and second strip pathway.

25. The system of claim 1, wherein the two part backing is moved along the pathway by a drive roller that pulls the first strip and the second strip evenly in the direction opposite from the first direction.

26. The system of claim 25, wherein the first strip and the second strip are pierced by the drive roller to enable said pulling.

27. The system of claim 21, further comprising:

a reel receptacle configured to receive the reel of labels on the two part backing;

wherein the pathway comprises a tensioning roller configured to maintain tension on the two part backing along the pathway from the reel to the stripping point.

28. The system of claim 27, further comprising a spring that applies a force to the tensioning roller for maintaining a substantially constant tension of the two part backing along the pathway, wherein the tensioning roller is mounted at a radius from the center of the reel receptacle that is greater than a radius of a full reel.

29. The system of claim 27, wherein the pathway further comprising a scollop wheel, a nip roller, and a tape control roller between the tensioning roller and the stripping point.

30. The system of claim 21, further comprising a bellows unit, wherein the bellows unit is configured to pull the label from the two part backing at the stripping point using suction.

31. The system of claim 20, wherein the bellows unit comprises a plurality of rotating sub-bellows, each sub-bellow being configured to extract single labels from the two part backing using suction and to apply single labels to food products via release of said suction.

32. The system of claim 31, wherein a particular sub-bellow is configured to remove the label by applying suction to a non-sticky side of the label to remove the label from the two part backing at a first position, wherein the particular sub-bellow is configured to be rotated to a second position, and wherein the particular sub-bellow is configured to apply the label to a particular food product upon detection of the particular food product at the particular sub-bellow in the second position.

33. The system of claim 32, wherein the particular sub-bellow is configured to be extended when applying the label to the particular food product.

34. The system of claim 21, wherein the system comprises a plurality of label applicators arranged so as to label multiple food products contained within a single container simultaneously.

35. The system of claim 21, wherein the food products comprise produce.

* * * * *